United States Patent [19]

Iltis et al.

[11] Patent Number: 4,936,875
[45] Date of Patent: Jun. 26, 1990

[54] RARE EARTH BORIDE ABRASIVE/POLISHING AGENTS

[75] Inventors: Alain Iltis, Aubervilliers; Patrick Maestro, Fosses, both of France

[73] Assignee: Rhone-Poulenc Chimie, Courbevoie, France

[21] Appl. No.: 352,950

[22] Filed: May 17, 1989

[30] Foreign Application Priority Data

May 18, 1988 [FR] France .................................. 88 06623

[51] Int. Cl.⁵ .............................................. B24D 3/02
[52] U.S. Cl. ......................................... 51/309; 51/293; 51/295; 51/308
[58] Field of Search .................... 51/293, 295, 308, 309

[56] References Cited

U.S. PATENT DOCUMENTS

| | | | |
|---|---|---|---|
| 4,512,946 | 4/1985 | Brun et al. | 51/309 |
| 4,529,410 | 7/1985 | Khaladji et al. | 51/309 |
| 4,601,755 | 7/1986 | Meélard et al. | 51/309 |
| 4,786,325 | 11/1988 | Melard et al. | 51/309 |
| 4,863,490 | 9/1989 | Buljan et al. | 51/293 |

Primary Examiner—A. Lionel Clingman
Assistant Examiner—Willie J. Thompson
Attorney, Agent, or Firm—Burns, Doane, Swecker & Mathis

[57] ABSTRACT

Particulates, e.g., powders, of the rare earth borides are well suited for the effective abrasion/polishing of a variety of characteristically hard substrate face surfaces, e.g., hard ceramic surfaces.

19 Claims, 1 Drawing Sheet

RARE EARTH BORIDE ABRASIVE/POLISHING AGENTS

BACKGROUND OF THE INVENTION

1. Field of the Invention

The present invention relates to novel abrasives/polishing agents based on the rare earths, and more especially, to such novel abrasives/polishing agents as are useful for abrading and polishing particularly hard substrates.

2. Description of the Prior Art

Among the abrasive and polishing materials currently commercially available, exemplary are alumina, silicon carbide, cubic boron nitride and diamonds.

Alumina and silicon carbide are inexpensive materials. However, alumina cannot be used for lengthy periods of time. And silicon carbide is known to be reactive, to a certain extent, with various substrates typically sought to be abraded and/or polished, notably various steels. Furthermore, its hardness may be inadequate for the abrasion of ceramics.

Boron nitride and diamonds are excellent abrasives, but their cost is much greater than that of conventional abrasive materials.

SUMMARY OF THE INVENTION

Accordingly, a major object of the present invention is the provision of novel abrasive and polishing compositions that approach boron nitride and diamonds in terms of technical performance, but which are far less costly.

The abrasive and polishing compositions of this invention satisfy numerous technical requirements. In particular, they comprise particles of a high hardness having a moderate rupture strength and they can be broken to produce edges. The subject abrasive particulates have a certain ability to rupture in order to provide the necessary abrasive properties, but are not excessively fragile (and, therefore, they have a satisfactory useful life). Finally, the abrasive and polishing compositions of this invention are unreactive with those substrates typically sought to be abraded and polished.

Briefly, the present invention features abrasive and polishing compositions comprising at least one rare earth boride and their use, in particular, for abrading and/or polishing especially hard substrates.

DETAILED DESCRIPTION OF THE PREFERRED EMBODIMENTS OF THE INVENTION

Figure 1:
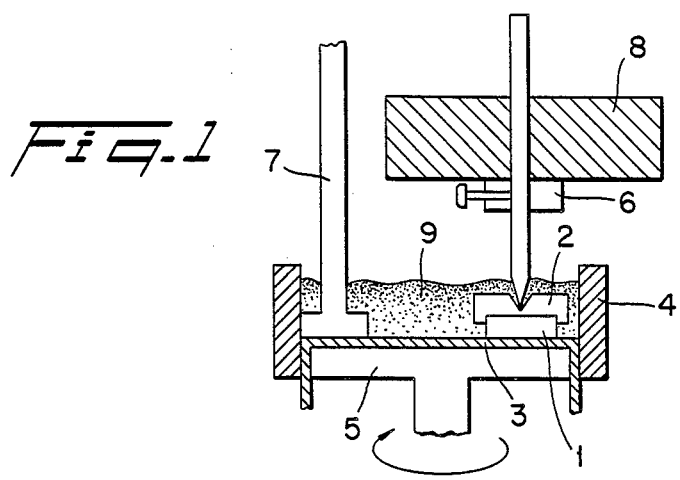
FIG. 1 is a schematic cross-sectional view of suitable apparatus for determining the efficacy of the abrasive/polishing agents according to the present invention.

More particularly according to the present invention, by the expression "rare earths" are intended the rare earth elements designated the lanthanides, having atomic numbers ranging from 57 to 71, as well as yttrium, having an atomic number of 39.

It has now unexpectedly and surprisingly been discovered that the rare earth borides have abrasion properties higher than those of the conventional abrasives, and yet are as hard as boron carbide and silicon carbide. Abrasion performance equivalent to that of diamonds may be realized by increasing the rare earth boride concentration in the compositions of the invention to a value within very reasonable limits, thereby making such compositions quite attractive.

The abrasive/polishing agents according to this invention are the rare earth borides. There are several types of rare earth borides. For example, rare earth hexaborides have a cubic elementary lattice of the CsCl type. The rare earth tetraborides crystallize in the quadratic system.

According to this invention, any type of rare earth boride may be used, but the rare earth hexaborides are the preferred.

The preferred rare earth borides are terbium, cerium and ytterbium borides, but from an economic standpoint it is more desirable to use the ceric rare earth borides; these are the borides of cerium, lanthanum, praseodymium and neodymium.

The rare earth borides are known compounds, various preparations of which have been described in the literature. For example, a rare earth boride may be prepared from a rare earth oxide by borocarbothermia process [G.A. Meerson et al, Izv. Akad. Nauk SSSR Neoro. Mater., 3, No. 5, pp. 802–806 (1967)]. It is also possible to prepare a rare earth boride by the reduction of a rare earth chloride utilizing elemental boron (FR 87/16,396), optionally in the presence of aluminum (FR 88/05332).

The rare earth borides employed as abrasives and polishing agents according to this invention are advantageously in the form of a powder, the grain or particle size of which ranges from 0.5 to 100 $\mu$m; the mean particle diameter of such powder preferably is around 10 $\mu$m.

In certain cases, it may be advantageous to conduct ultrasonic comminution of the rare earth boride agglomerates, or, if necessary, a grinding operation in an air jet grinder.

The rare earth boride compositions constituting the abrasive and polishing agents according to this invention may be used in a wide variety of surface treatment processes. Such abrasion and polishing techniques are abundantly described in the literature [see, for example, KIRK OTHMER, *Encyclooedia of Chemical Technology*, 1, pp. 26–52 (Third edition)].

The subject compositions are eminently well suited for the treatment of hard substrates. Exemplary of such substrates are the ceramics, such as alumina; the carbides of tungsten, tantalum, zirconium, beryllium, titanium, silicon, boron; the nitrides of titanium and silicon; metals and more particularly titanium, zirconium, hafnium, vanadium, niobium, tantalum, chromium, molybdenum, tungsten, manganese, iron, cobalt and nickel; the inorganic glasses, etc.

The rare earth borides according to the invention may be used in the form of conventional abrasives/polishing agents. Thus, they may be used in the form of powders, which may be employed by themselves or deposited onto a support, or agglomerated by means of a binder.

If they are used in the form of a powder, they may be applied in the dry state, but most frequently they are used in suspension in a liquid, for example water, in a concentration that may range from 10 to 2,000 g/l.

Rare earth borides in powder form may also be deposited in a relatively thin layer with the aid of a glue or a synthetic resin (preferably a phenolic resin) onto a support such as paper or a fabric. The form of such a support coated with the abrasive may vary greatly: individual sheets or sheets on a wheel, disks, strips, belts, and the like.

It is also possible to bond the abrasive powders of the invention by means of a binder, most typically of the vitrified (ceramic) or polymer type (for example, bakelite), in an inert matrix and of a suitable shape, e.g., a conical or cylindrical shaped article, or a flat or curved disk, etc.

In order to further illustrate the present invention and the advantages thereof, the following specific examples are given, it being understood that same are intended only as illustrative and in nowise limitative.

In said examples to follow, the abrasion and polishing properties of the rare earth borides are demonstrated, but the test used to determine these properties will first be described. The test was carried out utilizing a polishing machine shown schematically in FIG. 1.

In FIG. 1, the material to be polished in the form of a tablet or wafer 1, positioned by means of workpiece holder 2. Polishing means 3 are disposed within rotating bowl 4. The remainder of the apparatus includes rotating disk 5, arm holder 6, guide rod 7, weight 8, and abrasive powder suspension 9.

The operating principle of the apparatus was as follows:

A motor, not shown in the drawing, rotated the bowl 4 containing the suspension of the abrasive powder 9. The material 1 to be polished was subjected to an elliptical rotational movement, under a constant pressure applied by the weight 8.

The two movements were correlated, and the material 1 to be polished was completely covered by the polishing means 3.

The particles of abrasive material were introduced between the polishing means 3 and the tablet 1 to be polished, whereby the exposed face surface of the latter was abraded/polished according to the invention.

The results are expressed as the speed of removal of material (E.E.V.), i.e., the average weight removed is related to:
(i) Unit of weight : mg;
(ii) Unit of surface : $dm^2$;
(iii) Unit of time : min.

| | |
|---|---|
| (a) Type of polishing | "flooded"; |
| (b) Polisher | DP Plan felt; |
| (c) Speed of rotation | 23 rpm; |
| (d) Material to be polished | specimens having a thickness of 4 mm and a diameter of 25 mm; |
| (e) Pressure on the tablet | 600 g/cm$^2$; |
| (f) Concentration of the abrasive powder suspension | 125 g/l, unless otherwise indicated; |
| (g) Temperature | ambient (20° C.); |
| (h) Duration of test | intervals of 20 min. |

The polishing material was a DP Plan felt marketed by the Struers Co.; it was a felt of hard plastic material.

The tablet to be polished was a shaped article either of a silicon carbide (SiC) sintered to 99.5%, or a silicon nitride ($Si_3N_4$), both marketed by Ceramiques et Composites Co.

Examples 1 to 8 illustrate a polishing operation utilizing the abrasive compositions of the invention.

For purposes of comparison, five experiments were carried out using the following abrasives:
(i) Boron carbide, $B_4C$ (experiments A and C);
(ii) Silicon carbide, SiC (experiments B and D);
(iii) Diamonds (experiment E).

All of the above materials are marketed by the Struers Co. The powders of $B_4C$ and SiC had a grain size of 10 μm. The diamond material is marketed in the form of a suspension of 15 μm diamonds in a concentration of 8 g/l.

EXAMPLE 1:

Experiments A and B:

In these examples, cerium hexaboride was used as the abrasive/polishing agent.

The cerium hexaboride was prepared by the reaction, under an argon atmosphere at 1,500° C., for 15 hours, of ceric oxide with a mixture of elemental boron and carbon, both of which were used in a 10% stoichiometric excess.

The resulting agglomerates were comminuted ultrasonically. The final particulates had a mean particle diameter of 10 μm. The grain size distribution was measured by a diffraction/diffusion laser technique (apparatus marketed by Cilas-Alcatel).

Subsequently, an aqueous suspension of cerium hexaboride, $CeB_6$, was prepared, in a concentration of 125 g/l.

For the comparative experiments, suspension boron carbide, $B_4C$, (Experiment A) and silicon carbide (Experiment B) were prepared, in the same concentration of 125 g/l.

The abrasive properties were determined by polishing a wafer of silicon carbide.

The results are reported in Table I:

TABLE I

| Reference | Example 1 | Experiment A | Experiment B |
|---|---|---|---|
| Specimen | | SiC | |
| Abrasive | CeB$_6$ | B$_4$C | SiC |
| Concentration of the suspension (g/l) | | 125 g/l | |
| Duration (min) | | E.E.V. (mg/dm$^2$/mn) | |
| 20 | 5.5 | 1.6 | 1.1 |
| 40 | 1.8 | | 0.3 |
| 60 | 2.2 | | 0.4 |
| 80 | 2.3 | 0.8 | |
| 100 | 1.9 | 0.7 | |

It will be seen from Table I that the cerium hexaboride had superior abrasive properties relative to those of boron carbide and silicon carbide.

EXAMPLE 2:

The procedure of the above example and experiments was repeated under the same conditions, except that the material subjected to the abrasion test was silicon nitride.

The results are reported in Table II:

TABLE II

| Reference | Example 2 | Experiment C | Experiment D |
|---|---|---|---|
| Specimen | | Si$_3$N$_4$ | |
| Abrasive | CeB$_6$ | B$_4$C | SiC |
| Concentration of the suspension (g/l) | | 125 g/l | |
| Duration | | E.E.V. | |

TABLE II-continued

| (min) | (mg/dm²/mn) | | |
|---|---|---|---|
| 20 | 20.5 | 4.2 | 2.4 |
| 40 | 11.1 | 5.6 | |
| 60 | 8.3 | | |
| 80 | 7.9 | | 3.2 |
| 100 | 6.4 | 4.4 | 3.2 |
| 120 | 6 | 3.4 | 2.4 |

It was confirmed that the abrasive properties of cerium hexaboride relative to a ceramic material were clearly superior.

Figure 2:
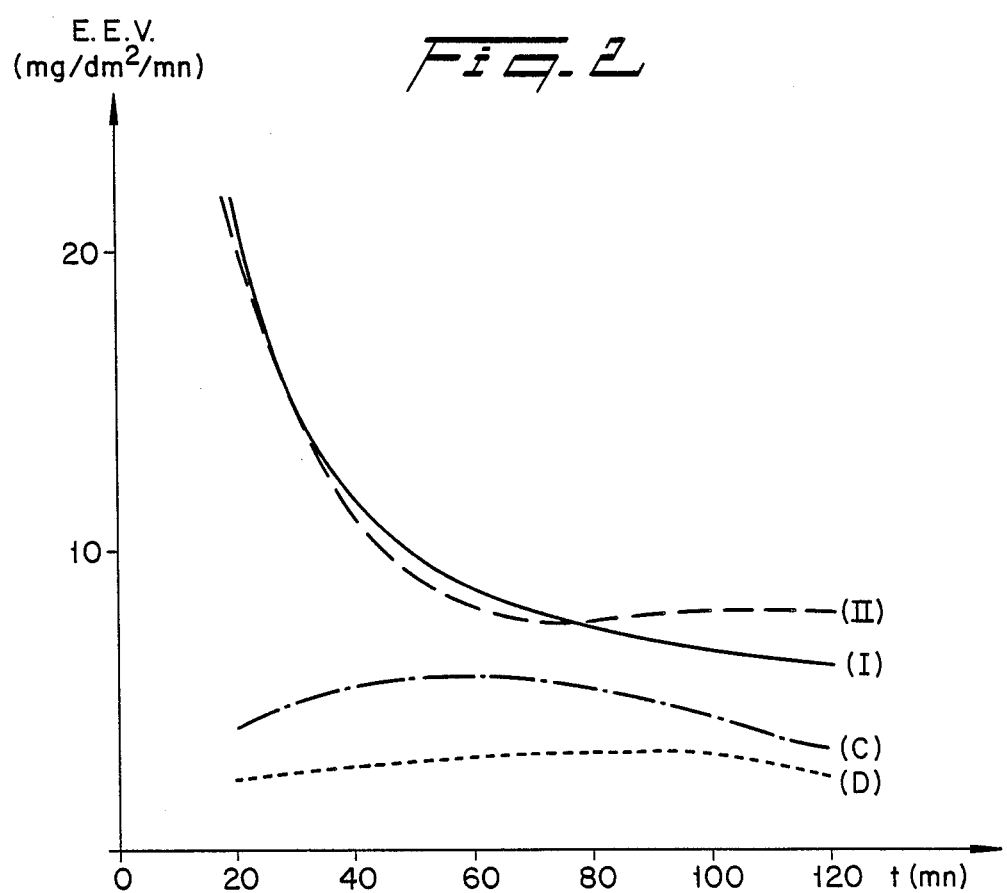
FIG. 2 is a graph plotting the results obtained utilizing the abrasive/polishing agents of the present invention versus those of the prior art.

The entirety of the results reported in Table II were plotted in FIG. 2, which represents the variation in the speed of material removal (E.E.V.) as a function of time (t).

Curves (I), (C), (D) respectively correspond to cerium hexaboride, boron carbide and silicon carbide.

The graph of FIG. 2 clearly shows the superiority of the abrasives/polishing agents of the invention.

EXAMPLES 3 and 4:

In the following examples, a lanthanum hexaboride and a praseodymium hexaboride were used as the abrasive agents.

The lanthanum and praseodymium hexaborides were prepared by reacting their respective oxides, $La_2O_3$ and $Pr_6O_{11}$, with elemental boron and carbon according to the process used to prepare the cerium hexaboride in Example 1.

The powders obtained had a mean particle diameter of 65 μm for the lanthanum hexaboride and 19 μm for the praseodymium hexaboride.

The lanthanum hexaboride and the praseodymium hexaboride were then suspended in water, at a concentration of 125 g/l.

The abrasion test was then carried out on a wafer of silicon nitride.

The results are reported in Table III. As a reference, the results obtained with cerium hexaboride are reported.

TABLE III

| Reference | Example 2 | Example 3 | Example 4 |
|---|---|---|---|
| Specimen | | $Si_3N_4$ | |
| Abrasive | $CeB_6$ | $LaB_6$ | $PrB_6$ |
| Concentration of the suspension (g/l) | | 125 g/l | |
| Duration (min) | | E.E.V. (mg/dm²/mn) | |
| 20 | 20.5 | 20 | 12.4 |
| 40 | 11.1 | 11 | 6 |
| 60 | 8.3 | 7.8 | 5.8 |
| 80 | 7.9 | 7.6 | 5 |
| 100 | 6.4 | 8 | 4.3 |
| 120 | 6 | 8 | 3.6 |

The very good results obtained using lanthanum hexaboride were noted: they are illustrated by the curve (II) of the graph of FIG. 2.

EXAMPLES 5 to 8:

In the following tests, suspensions, in water, of cerium hexaboride in different proportions, 11 g/l, 30 g/l, 60 g/l, 90 g/l, were used.

The tests were carried out on a wafer of silicon nitride.

The results obtained are reported in Table IV.

TABLE IV

| Reference | Example 5 | Example 6 | Example 7 | Example 8 | Example 2 |
|---|---|---|---|---|---|
| Specimen | | | $Si_3N_4$ | | |
| Abrasive | | | $CeB_6$ | | |
| Concentration of the suspension (g/l) | 11 | 30 | 60 | 90 | 125 |
| Duration (min) | | | E.E.V. (mg/dm²/mn) | | |
| 20 | 1.3 | 5.6 | 14.3 | 14.4 | 20.5 |
| 40 | 0.4 | 2.8 | 6.3 | 7.9 | 11.1 |
| 60 | 0.2 | 2.0 | 4.2 | 5.5 | 8.3 |

An increase in the speed of material removal with increasing concentrations of cerium hexaboride in the aqueous suspension was apparent.

Experiment E:

In order to compare the abrasive properties of cerium hexaboride and diamonds, the test was carried out using the aforesaid commercial diamond suspension.

The results are reported in Table V.

TABLE V

| Reference | Experiment E |
|---|---|
| Specimen | $Si_3N_4$ |
| Abrasive | Diamonds |
| Concentration of the suspension (g/l) | 8 |
| Duration (min) | E.E.V. (mg/dm²/mn) |
| 20 | 6.25 |
| 40 | 3.4 |

A comparison of the results reported in Tables IV and V evidences that, at equal concentrations, the abrasive strength of cerium hexaboride was less than that of the diamonds, but that it became equivalent for a concentration of approximately 35 g/l.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An abrasive/polishing composition of matter, comprising an effective abrasion/polishing amount of particulates of at least one rare earth boride dispersed in a compatible matrix medium therefor.

2. An abrasive/polishing shaped article of manufacture comprising a support substrate coated with an effective abrasion/polishing amount of particulates of at least one rare earth boride.

3. An abrasive/polishing shaped article of manufacture comprising a solid support matrix having an effective abrasion/polishing amount of particulates of at least one rare earth boride distributed therethrough.

4. The shaped article of manufacture as defined by claim 2, comprising a sheet, disk, strip or belt.

5. The shaped article of manufacture as defined by claim 3, said solid support matrix comprising a ceramic material or synthetic polymer.

6. In a process for the abrasion/polishing of a substrate face surface, the improvement which comprises utilizing as the abrasive/polishing agent therefor, an effective abrasion/polishing amount of particulates of at least one rare earth boride.

7. The process as defined by claim 6, said at least one rare earth boride comprising a boride of lanthanum or yttrium.

8. The process as defined by claim 6, said at least one rare earth boride comprising cerium hexaboride, lanthanum hexaboride, or praseodymium hexaboride.

9. The process as defined by claim 6, said at least one rare earth boride comprising a boride of terbium, cerium or ytterbium.

10. The process as defined by claim 6, said at least one rare earth boride comprising a boride of neodymium.

11. The process as defined by claim 6, said particulates of at least one rare earth boride comprising a powder.

12. The process as defined by claim 11, said powder having a particle size ranging from 0.5 to 100 $\mu m$.

13. The process as defined by claim 12, said powder having a particle size of about 10 $\mu m$.

14. The process as defined by claim 6, said substrate face surface comprising a ceramic, metal or glass.

15. The process as defined by claim 14, said substrate face surface comprising a ceramic.

16. The process as defined by claim 15, said ceramic comprising a silicon carbide or nitride.

17. In a process for the abrasion/polishing of a substrate face surface, the improvement which comprises utilizing as the abrasive/polishing agent therefor, the abrasive/polishing composition as defined by claim 1.

18. In a process for the abrasion/polishing of a substrate face surface, the improvement which comprises utilizing as the abrasive/polishing agent therefor, the abrasive/polishing shaped article as defined by claim 2.

19. In a process for the abrasion/polishing of a substrate face surface, the improvement which comprises utilizing as the abrasive/polishing agent therefor, the abrasive/polishing shaped article as defined by claim 3.

* * * * *